Oct. 14, 1969     R. B. SCHAEFER     3,472,427

DESTRUCTIBLE VALVE

Filed April 20, 1967

INVENTOR.
Robert B. Schaefer
BY Edward A. Sager
ATTORNEY

United States Patent Office 3,472,427
Patented Oct. 14, 1969

3,472,427
DESTRUCTIBLE VALVE
Robert B. Schaefer, Malvern, Pa., assignor to Pennsalt Chemicals Corporation, Philadelphia, Pa., a corporation of Pennsylvania
Filed Apr. 20, 1967, Ser. No. 632,382
Int. Cl. B65d *49/02, 83/14;* F16k *17/40*
U.S. Cl. 222—147                                10 Claims

ABSTRACT OF THE DISCLOSURE

A destructible valve with a movable stem for opening and closing the valve is provided with means predisposing the stem to deliberate destruction, whereby the valve may be rendered unfit for subsequent use with a container for pressurized fluid, said means being an interfering thread turn positioned to strip one of the cooperating threads between the stem and the bore, and/or a notch in the stem adjacent a handle for the stem. The valve body may have a thermal safety plug of tapered form pressed into an outwardly tapering exit portion of a pressure relief passageway which originates below an annular sealing surface on the valve body and exits above the sealing surface.

DISCLOSURE OF THE INVENTION

This invention relates to a destructible valve which may have a thermal safety plug, and more particularly to those of the kind which may be rendered unfit for further use with a container for pressurized fluid by a simple and intentional act on the part of the original user.

An ideal valve of the type set forth should be economical, efficient, easy to use and control, and also simple to destroy so that it cannot be reused. The latter is done to comply with governmental regulation concerning the refilling and reuse of pressure vessels. Such valves heretofore have lacked one or more of the mentioned desirable characteristics, in that usually they are not easily destroyed; often they are clumsy to handle; and frequently they inefficiently emit pressurized gas at flow rates of less than 20 cubic feet per minute, thereby unduly prolonging such tasks as charging a refrigeration system.

Furthermore, if equipped with thermal safety plugs these are usually provided by pouring a molten eutectic alloy having a melting temperature of 150° to 165° F. into a fluxed passage in the valve body wherein it is supposed to freeze and bond in place. All too often, however, problems arise from flux deposits, blow holes and shrinkage, with the result that defective plugs are produced.

According to the present invention, the valve body includes a threaded counterbore, with at least one outer end turn of this thread interfering with cooperating threads of the valve stem in order that continued opening movement of the valve beyond a point of initial resistance will strip the threads from the stem and thus render the valve unfit for further use. In addition, or alternatively, a notch can be formed in the stem adjacent the handle so that with a snap of the handle the stem can be broken and separated from the handle while the valve is in open position, also for the purpose of making the assembly unsuitable for further use.

The thermal plug of the present invention is more efficiently and more effectively provided by a drill hole extending through the valve body from a point of entry below an annular sealing surface on one exterior side of the valve body to an exit point on the other side of the body above the annular sealing surface to form an outwardly tapering relief passage which communicates with the container through a bore of the valve body. The relief passageway is press fitted with a tapered plug and sealed with conventional luting material.

Figure 1:
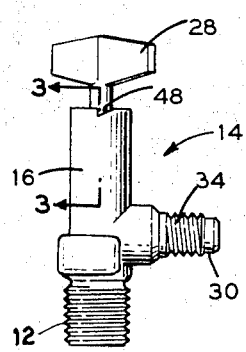
FIG. 1 is an elevational view of the valve of the present invention.
Figure 2:
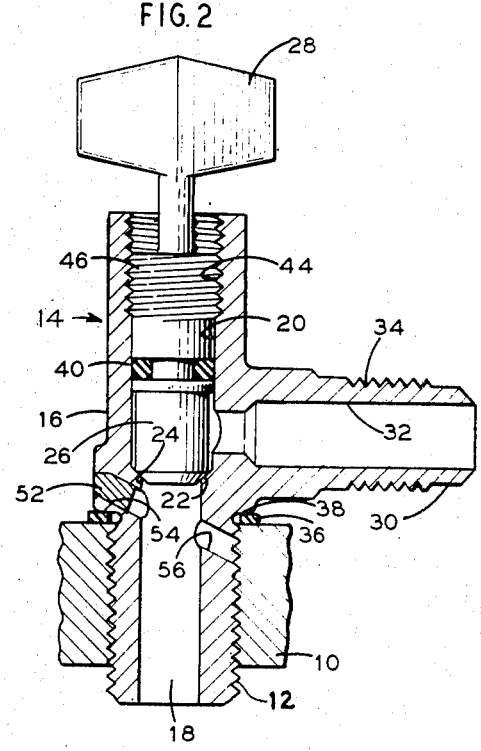
FIG. 2 is a view, partly in elevation and partly in longitudinal section, of a valve constructed according to the invention and shown on a larger scale than in FIG. 1.
Figure 3:
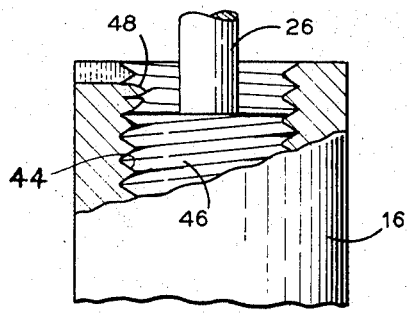
Figure 4:
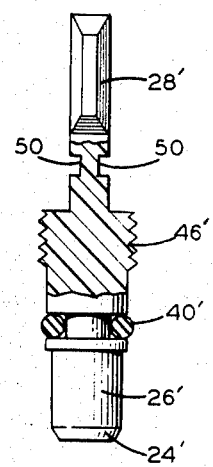

FIG. 3 is a greatly enlarged view, partly in elevation and partly in section along lines 3—3 of FIG. 1, of a fragment of the valve of FIGS. 1 and 2, showing the interfering thread of the valve body in detail; and FIG. 4 is an elevational view of a modified valve stem which may be used in the valve body of FIGS. 1 and 2 according to the invention.

Figure 1A:
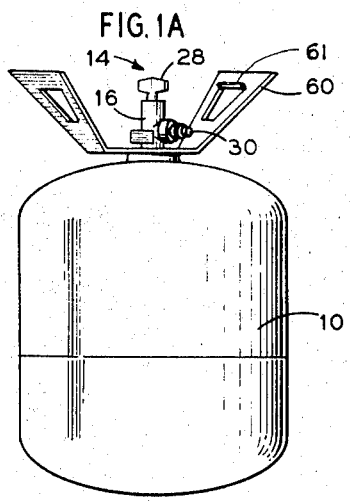
FIG. 1A is a perspective view of the valve of FIG. 1 in assembly with a container and carrying handle-stand, shown on a smaller scale.

Referring to the drawings in greater detail, there is shown in FIG. 1A a metal throw-away container 10, serving as a pressure vessel for 25 to 50 pounds of liquefied pressurized gases and having a threaded hole, as best seen in FIG. 2, for receiving the externally threaded lower end 12 of a valve 14. The latter, as shown in FIG. 2, includes a vertically elongated body 16 having a longitudinal bore 18 and an upper longitudinal counterbore 20. Between the bore 18 and counterbore 20 is defined an internal annular valve seat 22 intermediate the upper and lower ends of the valve body 16. The valve seat 22 is adapted to engage in sealing relationship with the beveled lower end 24 of a vertically elongated valve plug or stem 26, said stem being equipped at its upper end with a handle 28 formed unitarily or integrally therewith from nylon, fluoropolymer, or other tough, gas impermeable, non-porous, thermoplastic material.

A valve discharge or outlet nipple 30 is also provided, and it extends transverse to the longitudinal extent of the valve body 16 so that its bore 32 communicates with the bore 18 and container 10 through the lower end portion of the counterbore 20, immediately above the valve seat 22. When the lower end 24 of the stem 26 and the valve seat 22 are spaced apart the valve is in open position and pressurized fluid can flow out of the container 10 at rates up to 45 cfm. via the bore 18, the counterbore 20, and the bore 32 to a fluid receiving member (not shown) which may be connected to external threads 34 of the nipple 30.

In order to establish a fluid tight seal between the container 10 and the valve 14 as in FIG. 2, a circular gasket 36 of nylon or other suitable compressible material is interposed between the top surface of the container 10 and an annular, downwardly facing sealing surface 38 on the exterior of the valve body 16, immediately above its threaded lower end 12.

In order to establish a fluid tight seal between the stem 26 and the counterbore 20, an O-ring 40 of elastomeric material is interposed therebetween, being held in place on the stem 26 for longitudinal movement therewith by means of an annular groove of less depth than the thickness of the ring 40. The projecting portion of the thickness of the ring 40 slightly exceeds the radial clearance between the stem 26 and the counterbore 20 so that a compressive, snugly sealing fit is maintained. The lower counterbore surface which engages the O-ring 40 is smooth and unthreaded for at least the length of longitudinal movement of the stem 26 required for its beveled lower end 24 to be sufficiently spaced from the seat 22 to keep the flow path between the bores 18 and 32 unrestricted.

In keeping with the aforementioned required longitudinal movement of the stem 26 relative to the valve body 16, cooperating threads of at least similar length are provided at the upper end portion of the counterbore 20 and on the stem 26 between the handle 28 and the O-ring 40. These threads of the counterbore 20 and the stem 26 are respectively designated by the reference numerals 44 and 46.

As shown in FIG. 3, a portion of the uppermost or outermost turn 48 of the threads 44 of the counterbore 20 is disposed in interfering relation to the path of the threads 46 of the stem 26. This interfering relationship can be accomplished in any suitable manner. For example, if the valve body 16 were to be made of a moldable plastic material the mold is made accordingly. But it is also possible, as in the preferred and illustrated form of the invention, to die cast or forge the valve body 16 of brass, zinc or aluminum, then machine it to shape, and produce the interfering thread turn 48 by a peening operation (see FIG. 1 at 48). Such interfering thread turn 48 locks the stem 26 within the valve body 16 and it also serves as an abutment surface to resist inadvertent removal of the stem 26 from the valve body 16, since the interfering thread 48 extends inwardly of the bore 20 to a greater extent than the inside diameter of the threads 44 and the outside diameter of the threads 46.

Continued turning of the handle 28 in opening direction, beyond a point of initial resistance by thread 48 to move the stem 26 outwardly of valve 14, strips the threads 46; provided, of course, that the valve body 16 is made of appreciably harder material than the stem 26.

It is to be noted that the threads 46 of the stem 26 have a larger outside diameter than the rest of the stem disposed within the counterbore 20; and also that the threads 44 are set below, or on a larger diameter than, the smooth or unthreaded portion of the counterbore 20. Stated another way, the cooperating threads 44 and 46 are in radially overlapping and cooperating relationship along a helical line of larger diameter than the counterbore 20 and the stem 26. Thus, by stripping one of the threads 44, 46, in this instance the threads 46, by means of an interfering turn 48 on a diameter no larger than the counterbore 20 there is nothing to hold the stem 26 within the counterbore 20 against pressure forces originating in container 10 if it were to be refilled; wherefore the valve 14 is rendered unfit for further use.

Optionally, and with or without the aforemntioned interfering thread 48, the valve body 16 of FIGS. 1 and 2 can be used with the valve plug or stem 26' of FIG. 4, primed numerals being used to designate parts corresponding to similar parts of the plug or stem 26 previously described. One or more notches 50 are formed between the threads 46' and the handle 28' to provide a narrow waist portion on the stem 26 which resists the torque forces resulting from normal opening and closing of the valve, but which is susceptible to fracture by a bending force imposed by the hand of a man of ordinary strength in snapping the handle 28' at right angles to the longitudinal axis of the stem 26', or more simply by striking the handle 28' a sharp, deliberate blow against a solid object. As a result, the valve 14 and the assembly of which it is a part are no longer fit for reuse. If the notch 50 is located close to the threads 46, it is necessary for the valve 14 to be in open position when the handle 28' is removed; and thus in the normally closed position of the valve the notch 50 will be protectively positioned within the upper, threaded end of the counterbore 20 so as to minimize the possibility of accidental breakage of the stem 26'.

Referring again to FIG. 2, a thermal safety plug 52 is preferably disposed within an outwardly tapering relief passageway 54 which extends through the wall of the valve body 16 from the bore 18 and exits above the annular sealing surface 38. This relief passageway 54 is preferably formed by a drill with a tapered tip which enters the valve body at the threaded lower end portion 12, forming an entrance hole 56 below the sealing surface 38, then passes through the bore 18, and continues in a straight line to enter the opposite face of the bore 18 without letting the tapered drill tip pass entirely through the opposite side of the valve body 16. The tapered plug 52 is of an eutectic alloy or other material having the desired melting point, e.g. 150 to 165° F., inserted and pressed into the passageway 54 from either the bore 18 or the entrance hole 56 and sealed in the passageway 54 with any suitable luting material such as white lead. The entrance hole 56 can be left open without loss of gas therethrough since it is positioned below the sealing surface 38 and the avenues of exit therefrom are closed.

Referring again to FIG. 1A, the assembly may further include a carrying handle 60 held in place between the container 10 and the valve 14. The handle 60 is of generally U-shape, being formed from flat sheet metal with a flange 61 at the upper margin of a hand hole in each free end portion. If the assembly is inverted the extreme edges of the free end portions of the handle 60 will provide support.

I claim:

1. A valve for pressurized fluid comprising:
   (a) a body having
   (b) a longitudinal bore and
   (c) a discharge passageway communicating with said bore,
   (d) a stem plugging said bore and being movable in said bore for opening said passageway in first position thereof and for closing said passageway in second position thereof,
   (e) said bore and said stem having
   (f) cooperating threads for holding said stem in plugging position within said bore against fluid pressure and guiding said plug for movement in directions extending through said first and second positions upon rotation of said plug, and
   (g) means predisposing said stem to deliberate destruction in open position, including an interfering thread turn extending from one of said cooperating threads into the path traveled by the other of said cooperating threads incident to movement of said stem from said second position beyond said first position, whereby said other cooperating thread is stripped and said valve is thereby rendered unfit for further use.

2. A valve according to claim 1 wherein said last named means further includes a notch formed in said stem.

3. A valve for pressurized fluid comprising:
   (a) a body having
   (b) a longitudinal bore and
   (c) a discharge passageway communicating with said bore,
   (d) a stem plugging said bore and being movable in said bore for opening said passageway in first position thereof and for closing said passageway in second position thereof,
   (e) said bore and said stem having
   (f) cooperating threads for holding said stem in plugging position within said bore against fluid pressure and guiding said plug for movement in directions extending through said first and second positions upon rotation of said plug,
   (g) and means predisposing said stem to deliberate destruction in open position including a notch formed in said stem wherein an end portion of said stem extends out of said bore in first position thereof, further including a handle on said stem at said end portion, and wherein said notch is formed in said end portion of said stem adjacent said handle to provide a narrow waist susceptible to fracture.

4. A valve according to claim 1 in combination with a container for pressurized fluid, said container having a hole formed therein to receive said valve body, with cooperating threads at the hole of said container and on the exterior of said valve body to secure said valve to said container with said passageway communicating with the interior of said container.

5. A valve according to claim 1 wherein the interfering thread turn is harder than said other cooperating thread.

6. A valve according to claim 1 wherein said one cooperating thread is formed in a portion of said bore at the end thereof approached by said stem as it is moved from second position toward first position, and wherein said interfering thread turn is the endmost turn of said one cooperating thread.

7. A valve according to claim 1 wherein the interfering thread turn is harder than said other cooperating thread, and further including an annular valve seat intermediate the ends of said bore adapted to engage the inner end of said stem in second position thereof, said interfering thread turn being the outer endmost of the thread turns formed in said bore, said interfering turn being on a diameter no larger than said bore in order to strip the threads of said stem down to a diameter no larger than said bore and less than that of the thread turns formed in said bore.

8. A valve for pressurized fluid comprising:
(a) a body having
(b) a longitudinal bore and
(c) a discharge passageway communicating with said bore,
(d) a stem plugging said bore and being movable in said bore for opening said passageway in first position thereof and for closing said passageway in second position thereof,
(e) said bore and said stem having
(f) cooperating threads for holding said stem in plugging position within said bore against fluid pressure and guiding said plug for movement in directions extending through said first and second positions upon rotation of said plug,
(g) means predisposing said stem to deliberate destruction in open position,
(h) an annular sealing surface formed about the bore axis on the exterior of said valve body intermediate its ends, one end of said valve body being threaded to adapt said valve to be received in the threaded hole of a container for pressurized fluid,
(i) an auxiliary passageway for pressure relief having an axis extending from a point on the exterior surface of the threaded end of said valve body across said bore and exiting said body on the exterior thereof between said annular sealing surface and the other end of said valve body, said auxiliary passageway terminating with an outwardly directed tapered portion at the end thereof between said annular sealing surface and the other end of said valve body,
(j) and a fusible plug in the outwardly directed tapered portion of said auxiliary passageway.

9. A valve having an elongated body with a longitudinal bore therethrough extending between opposite end portions thereof, one end portion of said body having threads and an annular sealing surface formed on the exterior of said body about the axis of said bore, said sealing surface being disposed between said threads and the other end portion, a pressure relief passageway having an axis extending through said bore transverse to said bore axis from a point on the exterior surface at said one end portion of said body and exiting at a point on the exterior of said body between said sealing surface and the other end portion, said pressure relief passageway terminating with an outwardly directed tapered portion at the end thereof between said annular sealing surface and the other end of said valve body, and a fusible plug in the outwardly directed tapered portion of said passageway between said bore and said point on the exterior of said body.

10. A valve according to claim 1, with said stem being an elongated member unitarily molded from plastic material, one end portion of said stem including a handle, the other end portion of said stem being of circular cross section and providing an annular surface adapted to engage a portion of said bore in sealing relationship, and a thread formed on the surface of said stem between said end portions, said thread having a larger outside diameter than said other end portion of said stem.

References Cited

UNITED STATES PATENTS

| | | | |
|---|---|---|---|
| 2,677,526 | 5/1954 | Johnson | 251—284 XR |
| 2,833,512 | 5/1958 | Sanborn | 251—368 XR |
| 3,157,219 | 11/1964 | Dimin et al. | 137—74 XR |
| 3,204,835 | 9/1965 | Michel | 222—541 |
| 3,323,546 | 6/1967 | Lord | 251—284 XR |

WILLIAM F. O'DEA, Primary Examiner

R. GERARD, Assistant Examiner

U.S. Cl. X.R.

16—110; 74—543; 137—74, 797; 222—396; 251—284